Figure 1:
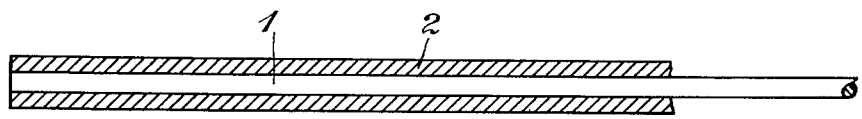

April 3, 1934.     F. WÖRTMANN     1,953,382
WELDING ROD
Filed March 18, 1931

Inventor:
F. Wörtmann,
by E. F. Wenderoth
Atty

Patented Apr. 3, 1934

1,953,382

UNITED STATES PATENT OFFICE 1,953,382

WELDING ROD

Franz Wörtmann, Geneva, Switzerland, assignor to Societe Anonyme des Ateliers de Secheron, Geneva, Switzerland, a company of Switzerland Application March 18, 1931, Serial No. 523,542
In Austria March 27, 1930

10 Claims. (Cl. 219—8)

The present invention relates to a method of welding by the electrical and chemical production of heat and to a welding rod for practising the said method.

The methods of welding known heretofore mostly employ only one source of heat. Only recently have a heating flame and an electric arc, or an electric arc and a chemical reaction (thermit), or all three heat sources been used simultaneously. Welding rods for electrical and chemical welding are provided with a coating of a reaction mixture.

In order to put in practice such methods, it has been customary to employ welding rods which are connected to one of the poles of a source of electric current (dynamo, transformer), the other pole being connected to the piece to be welded. These rods have a metal core and are coated with an envelope consisting of a mixture of products capable of reacting one upon the other, one of which mixtures consists particularly of a mixture of weight equivalents of substances capable of producing heat by an exothermic reaction, these substances being for example, on the one hand, a reducing agent and on the other hand, an oxygen-containing substance. Such a mixture is for example, 54.2 parts of Al and 159.7 parts of $Fe_2O_3$, which on reaction produce 102.2 parts of $Al_2O_3$ and 111.7 parts of iron. These mixtures are known under the name of "Thermit" and give, as it is well known, during the reaction, a very great amount of heat due to the burning of the aluminium. In place of this latter metal, any other of the known reducing substances may be used, for example, titanium, calcium, silicon, manganese, magnesium or their mixtures, or their ferro, nickel or copper alloys or other high percentage of these or other reducing metals.

According to the element employed the resulting thermits are respectively called "metal-thermit", "alumino-thermit", "titano-thermit", "calco-thermit", "silico-thermit", "mangano-thermit", "magneso-thermit". Also oxygen-containing constituents $MnO_2$, $NiO$, $Cr_2O_3$, etc., can be utilized in lieu of $Fe_2O_3$.

Thus the following mixtures can be compounded and give the following exothermic reactions:

$2Al+Fe_2O_3$ (i. e. 54,2 gr. Al and 159,7 gr. $Fe_2O_3$) = $Al_2O_3+2Fe$ (i. e. 102,2 gr. $Al_2O_3$ and 111,7 gr. Fe).
$3Si+2Fe_2O_3$ (i. e. 84,9 gr. Si and 319,4 gr. $Fe_2O_3$) = $3SiO_2+4Fe$ (i. e. 180,9 gr. $SiO_2$ and 223,4 gr. Fe).
$3Mn+Fe_2O_3=3MnO+2Fe$.
$3Mg+Fe_2O_3=3MgO+2Fe$.
$3Ca+Fe_2O_3=3CaO+2Fe$.

The above thermits all give iron; they not only can be employed separately but can also be compounded one with the other.

The following are nickel or chromium giving thermits:

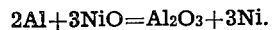
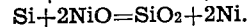
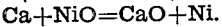
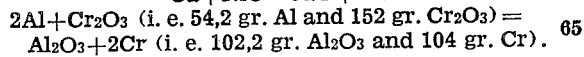

$2Al+3NiO=Al_2O_3+3Ni$.
$Si+2NiO=SiO_2+2Ni$.
$Ca+NiO=CaO+Ni$.
$2Al+Cr_2O_3$ (i. e. 54,2 gr. Al and 152 gr. $Cr_2O_3$) = $Al_2O_3+2Cr$ (i. e. 102,2 gr. $Al_2O_3$ and 104 gr. Cr).

We also have:

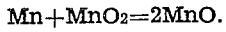

$Mn+MnO_2=2MnO$.

It is generally convenient to compound a plurality of thermits in order to obtain mixtures of iron, nickel and chromium in given quantities, these mixtures producing alloys with the pieces to be welded and with the metal of the core of the welding rod.

Further the heat of reaction of basic and acid minerals (called mineral thermit) may also be utilized in combination with the aforementioned oxidizing and reducing substances. In general, it is a question of substances which have already been extensively used. The essential point is that the proportions of the equivalent weights should be observed at least approximately.

The method of welding with such a rod is as follows: The welding rod is caused to melt off in the known manner by means of the electric arc, the coating being also melted off at the same time. The said coating or envelope should have a lower melting point than the welding metal, so that the envelope may be made quite thick without the extreme edges projecting excessively. As soon as the envelope has been made incandescent by the arc, the reaction begins. The said reaction should not proceed so rapidly as to cause its main effect to take place on the welding rod itself, and the main portion of the reaction should not be completed until the envelope has already been melted. The envelope is then brought into extremely intimate contact with the work, heats it and, floating on the molten metal, reheats the latter. The molten metal therefore has time to be refined and, due to the heat generated by the slag itself, cools slowly, i. e. the slag refines the weld. The welding metal then possesses a much higher ductility than can be attained in the ordinary arc welding.

Experience has now shown that with the reaction mixtures the slag is extremely fluid and often completely covers the welding metal, even at the place where the arc is situated. The welding place is thus hidden from sight, and the welder cannot at once put his metal where he wants it.

The present invention has for its object to remedy this inconvenience. According to the welding process of the invention, a powerful blast effect is produced at the end of the welding rod by means of chemically combined gases which are expelled under the action of heat, the said blast effect permitting the melted-down fluid reaction mixture, which is still in the course of reaction, to be blown away at any desired place.

The welding rod employed for the purpose is characterized in that its envelope consists mainly of a reaction mixture, such substances as are capable of giving off gases under the action of heat being also contained in the envelope.

Among the substances which are capable of giving off gases under the action of heat one may indicate the carbonates and the hydrates or water containing substances. The substances may be mixed with the above said thermits or may replace part or all of the oxygen-containing constituent or constituents of these thermits.

For example, the ferric oxide in the reaction mixture may be partly replaced by siderite (iron carbonate), or the manganese dioxide may be partly replaced by manganese carbonate.

As carbonate one may also indicate those of calcium, magnesium, etc., which all are decomposed, when heated, into $CO_2$ and a metallic oxide, this latter being eventually reduced during the thermit reaction. As hydrate or water containing substances, one may indicate kaolin, asbestos, muscovite (potash mica), lepidolite (lithia mica), the hydrates of iron, manganese, etc., which give off water vapor when heated.

The mixtures of carbonates and hydrates are specially well adapted for the invention. Experience has shown that the amount of carbonate or hydrate added to the thermit mixture shall not be too small or too great. Indeed, when too little substances giving off gases are contained in the mixture, the gas blast is not strong enough; on the contrary if there is an excess of such substances, the coating will be too cooled by the endothermic dissociation of these substances giving $CO_2$ or water vapour and the thermic reaction will proceed too slowly; the gaseous production will consequently also be too weak. The optimum proportion of carbonates or hydrates for the thermit mixture will lie at about 6–12%.

It will be observed that the admixture to a well known coating of a welding rod (coating consisting of the usual flux, slags, etc.) of the substances giving off gases, is not adapted to give the desired blast effect. On the contrary with the coating consisting of a thermit mixture such an admixture is largely sufficient for promoting the gaseous current adapted to blast the impurities reassembled on the welding. In this last case, when the coating is heated by the electric arc, the exothermic reaction takes place immediately. A very high temperature is rapidly obtained, which decomposes the carbonate or the hydrate by expelling suddenly gases nearly deflagrating. A single heating by means of the electric arc will not be sufficient for producing this development of gases; the thermit mixture is necessary.

The best way is to compound such substances which are able to react, after having given off their gases, with the substances of the thermit mixture or with the substances resulting from the exothermic reaction, forming for example aluminates or silicates. This formation will still increase the calorific value of the slags. The thermit mixture and the added carbonates and hydrates can be mixed with sodium silicate or another cement facilitating its application on the metallic core of the rod.

Figure 2:

The accompanying drawing shows a welding rod according to the invention. Fig. 1 is a longitudinal elevation thereof with parts shown in section. Fig. 2 is a section through the rod of Fig. 1. This rod consists of a metallic core 1 and a coating 2. This latter is composed of a thermit mixture containing 5–15% substances able to produce gases when heated. It can, for example, be constituted by the following mixture: 50% aluminothermit, 15% each of silico- and manganothermit, 5% carbonate, 5% hydrate and 10% other substances. The whole is agglomerated by means of soluble glass or of another binder.

The gases which on welding are suddenly expelled by the arc produce an intense blast effect at the end of the welding rod. The welder is thus able to guide as he wishes the thinly fluid reaction mixture, which is still in full reaction, to render visible at any desired place the iron located thereunder and thus to control the welding process. In the practical use of welding rods having an envelope of a reaction mixture containing a small quantity of substances which give off gases, it has been found that there is no detrimental effect on the purifying and refining action of the envelope, while manipulation is considerably facilitated. Moreover, with rods having a blast effect at the rod end, the envelope may be made thicker than in the case of ordinary reaction mixtures, thus increasing the heating effect of the slag without affecting the ease of manipulation.

If the substances which give off gases are located near the metal core, the blast effect will be particularly intense, because the surrounding layer of the envelope confines the stream of gas.

What I claim is:

1. A welding rod comprising a metallic core and an envelope consisting principally of a reaction mixture the constituents of which can react exothermically with each other, and at least one additional substance in said envelope which is capable of giving up, at the end of the rod adjacent the arc, chemically combined gases under the influence of heat, the said gases being expelled in the form of a blast capable of forcing the molten thermit mixture away from the joint to be welded in the immediate zone of deposition from the welding rod.

2. A welding rod, comprising a metal core, and an envelope comprising a mixture of thermit and materials capable of producing a blast of gas upon application of heat, to force the molten thermit mixture away from the joint to be welded in the immediate zone of deposition from the welding rod.

3. A welding rod, comprising a metal core, and an envelope comprising a mixture of thermit with from about 5–15% of a material producing a blast of gas upon the application of heat, to force the molten thermit mixture away from the joint to be welded in the immediate zone of deposition from the welding rod.

4. A welding rod, comprising a metal core, and an envelope comprising a mixture of thermit with from about 6–12% of a material producing a blast of gas upon the application of heat, to force the molten thermit mixture away from the joint to be welded in the immediate zone of deposition from the welding rod.

5. A welding rod, comprising a metal core, and an envelope comprising a mixture of thermit together with carbonates and hydrates, the latter ingredients being capable of producing a blast of gas upon application of heat, to force the molten thermit mixture away from the joint to be welded in the immediate zone of deposition from the welding rod.

6. A welding rod, comprising a metal core, and an envelope comprising a mixture of thermit with from about 5-15% of carbonates and hydrates, the carbonates and hydrates being capable of producing a blast of gas upon application of heat, to force the molten thermit mixture away from the joint to be welded in the immediate zone of deposition from the welding rod.

7. A welding rod, comprising a metal core, and an envelope consisting of a mixture of thermit together with carbonates and hydrates, the carbonates and hydrates being capable of producing a blast of gas upon application of heat, to force the molten thermit mixture away from the joint to be welded in the immediate zone of deposition from the welding rod, the carbonates being selected from the group consisting of calcium, magnesium and the other carbonates which will split up into carbon dioxide and a metallic oxide which will enter into the thermit reaction, and the hydrates being selected from the group consisting of kaolin, asbestos, potash mica, lithia mica, iron hydrate, and manganese hydrate.

8. A welding rod, comprising a metal core and and envelope consisting of a mixture of thermit together with about 5-15% carbonates and hydrates, the carbonates and hydrates being capable of producing a blast of gas upon application of heat, to force the molten thermit mixture away from the joint to be welded in the immediate zone of deposition from the welding rod, the carbonates being selected from the group consisting of calcium, magnesium and the other carbonates which will split up into carbon dioxide and a metallic oxide which will enter into the thermit reaction, and the hydrates being selected from the group consisting of kaolin, asbestos, potash mica, lithia mica, iron hydrate, and manganese hydrate.

9. A welding rod, comprising a metal core, and a coating formed of a mixture of about 50% alumino-thermit, 15% silico-thermit, 15% mangano-thermit, 5% of carbonates, 5% of hydrates, and the balance of non-detrimental impurities.

10. A welding rod, comprising a metal core, and an envelope comprising a mixture of thermit and materials capable of producing a blast of gas upon application of each, to force the molten thermit away from the joint to be welded in the immediate zone of deposition from the welding rod, at least some of the residue of said materials, following the evolution of the said gas, being capable of participating in the thermit reaction.

FRANZ WÖRTMANN.